(12) United States Patent
Morisawa

(10) Patent No.: US 8,605,319 B2
(45) Date of Patent: Dec. 10, 2013

(54) IMAGE READING APPARATUS CAPABLE OF READING IMAGES OF BOTH SIDES OF A DOCUMENT

(75) Inventor: Akira Morisawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1144 days.

(21) Appl. No.: 12/113,050

(22) Filed: Apr. 30, 2008

(65) Prior Publication Data

US 2008/0273229 A1    Nov. 6, 2008

(30) Foreign Application Priority Data

May 1, 2007    (JP) ................................ 2007-120799

(51) Int. Cl.
*G06K 15/00*    (2006.01)

(52) U.S. Cl.
USPC ......... 358/1.16; 358/1.15; 358/403; 358/400; 358/401; 358/408; 358/474; 358/496; 358/488; 358/498; 399/364; 399/363; 399/361

(58) Field of Classification Search
None
See application file for complete search history.

(56) References Cited

U.S. PATENT DOCUMENTS

| | | | |
|---|---|---|---|
| 4,908,719 A | 3/1990 | Nonoyama | |
| 5,170,445 A * | 12/1992 | Nelson et al. | 382/233 |
| 5,402,252 A * | 3/1995 | Kojima | 358/486 |
| 5,488,485 A | 1/1996 | Amemiya | |
| 5,619,343 A | 4/1997 | Amemiya | |
| 5,687,010 A * | 11/1997 | Van Tilborg et al. | 358/496 |
| 5,751,438 A * | 5/1998 | Murai et al. | 358/403 |
| 5,808,752 A | 9/1998 | Naba | |

FOREIGN PATENT DOCUMENTS

| | | |
|---|---|---|
| JP | 04-177968 A | 6/1992 |
| JP | 10-224622 A | 8/1998 |
| JP | 2000-032244 A | 1/2000 |
| JP | 2005-151001 A | 6/2005 |
| JP | 2006-191228 A | 7/2006 |

\* cited by examiner

*Primary Examiner* — Benny Q. Tieu
*Assistant Examiner* — Paul F Payer
(74) *Attorney, Agent, or Firm* — Canon U.S.A., Inc. IP Division

(57) ABSTRACT

Provided is an image reading apparatus communicatable with an image processing apparatus, including: a first reader that reads an image of a first side of a document; a first storage that stores the image read by the first reader; a second reader that reads an image of a second side of the document; a second storage that stores the image read by the second reader; a transmitter that transmits the images stored in the first storage and the second storage to the image processing apparatus; and a controller that, with respect to a first document whose length in a conveyance direction is longer than a predetermined length, causes the transmitter to transmit the image read by the first reader to the image processing apparatus, and causes the first storage and the second storage to store the image read by the second reader.

3 Claims, 9 Drawing Sheets

SHADING

START READING FRONT SIDE

START READING BACK SIDE

COMPLETE DISCHARGING

IMAGE READING APPARATUS CAPABLE OF READING IMAGES OF BOTH SIDES OF A DOCUMENT

BACKGROUND OF THE INVENTION

1. Field of the Invention

The present invention relates to an image reading apparatus capable of reading images of both sides of a document.

2. Description of the Related Art

Conventionally, there has been available an image reading apparatus that has a sequence to read images of both sides of a document by one document conveyance (one pass double side sequence) by being separately provided with a sensor that reads the image of the front side of the document and a sensor that reads the image of the back side of the document.

Examples of the image reading apparatus that executes the one pass double side sequence include an apparatus in which a memory for storing front side images and a memory for storing back side images are independently provided as disclosed in Japanese Patent Application Laid-Open No. 2006-191228. This image reading apparatus is structured so that the image data of the front and back sides is transmitted from the memories for the front side and back side to an image processing apparatus (hereinafter, referred to as controller) provided in an image forming apparatus.

However, the invention described in Japanese Patent Application Laid-Open No. 2006-191228 does not take into consideration a case where a long document (a document longer than the A3 size, for example, a document that is equal to or longer than 420 mm and equal to or shorter than 630 mm in the conveyance direction) is read.

That is, in many cases, the memory size of the image reading apparatus is a size capable of storing the image data of an A3-size document that is read with a maximum resolution (for example, 600 dpi). However, in the case of a long document, the read image cannot all be stored in the memory.

To cope with this problem, it is conceivable to increase the memory size to the size of a long document that is not usually used, for the double side reading of the long document. However, a more expensive memory is required, which increases the manufacturing cost.

SUMMARY OF THE INVENTION

The present invention provides an image reading apparatus capable of reading both sides of a long document without increasing a memory size in the structure in which the images of both sides of a document are read by one document conveyance.

The present invention provides an image reading apparatus capable of communicating with an image processing apparatus, the image reading apparatus including: a first reader that reads an image of a first side of a document; a first storage that stores the image read by the first reader; a second reader that reads an image of a second side of the document; a second storage that stores the image read by the second reader; a transmitter that transmits the images stored in the first storage and the second storage to the image processing apparatus; and a controller that, with respect to a first document whose length in a conveyance direction is longer than a predetermined length, causes the transmitter to transmit the image read by the first reader to the image processing apparatus, and causes the first storage and the second storage to store the image read by the second reader.

Further features of the present invention will become apparent from the following description of exemplary embodiments with reference to the attached drawings.

DESCRIPTION OF THE PREFERRED EMBODIMENTS

Hereinafter, an embodiment of the present invention will be described with reference to the drawings.

(Structure of the Apparatus)

Figure 1:
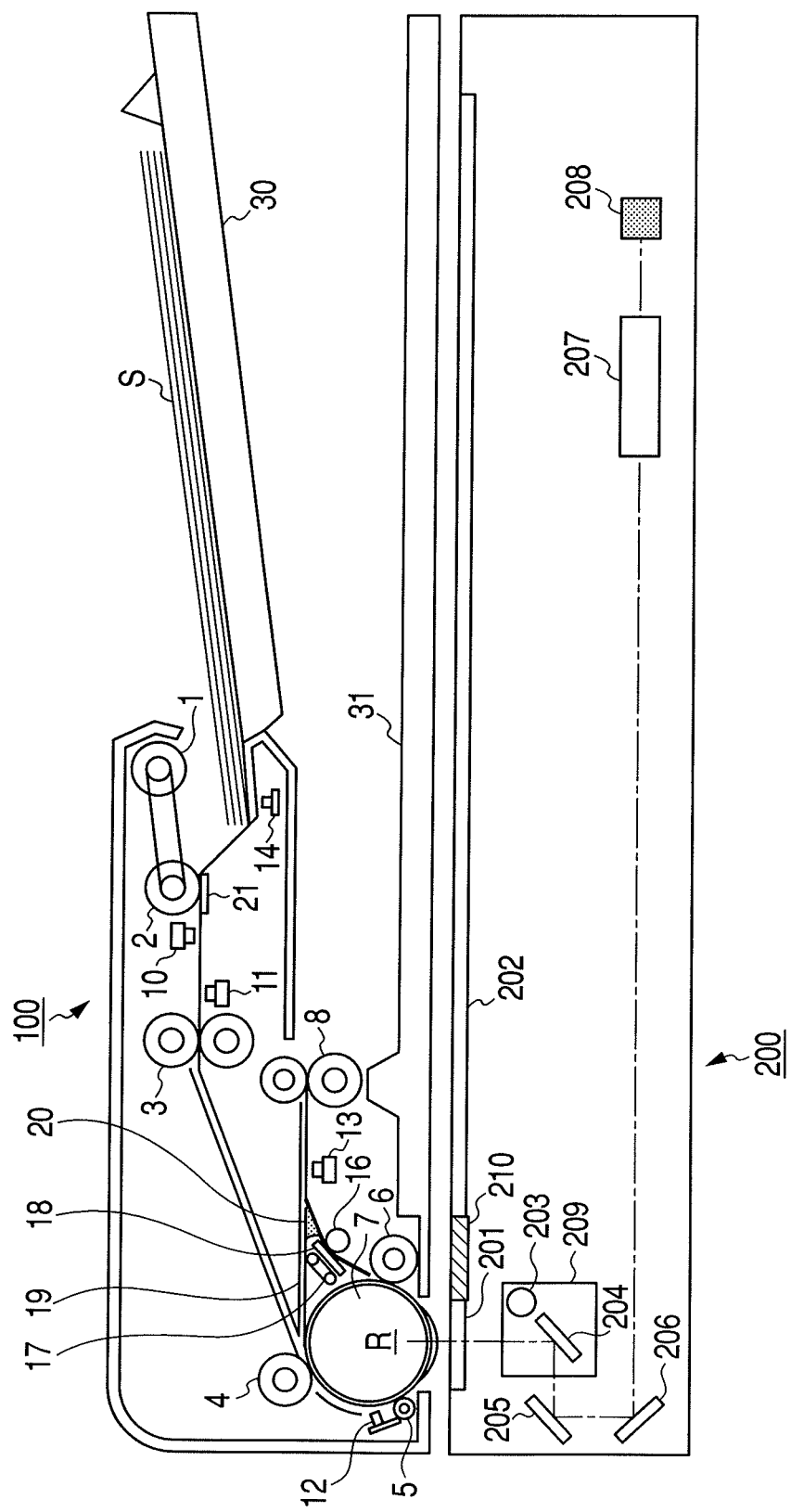
FIG. 1 is a cross-sectional view of an ADF 100 and a reader 200 in an image reading apparatus.

FIG. 1 is a cross-sectional view illustrating the structure of an automatic document feeder (hereinafter, referred to as ADF) 100 and an image reading apparatus (hereinafter, referred to as reader) 200 in this embodiment.

A feeding roller 1 feeds the top document of a document stack S placed on a document tray 30. The document fed by the feeding roller 1 is separated into one sheet by a separating roller 2 and a separating pad 21, and conveyed by a pair of conveying rollers 3 until abutting against a resist roller 4, whereby the document becomes looped, and skew feeding in the document conveyance is prevented.

The document having passed the resist roller 4 is sent onto a skimming glass 201 by a conveying roller 5 and a large roller 7, and conveyed by a conveying roller 6. The document having passed the conveying roller 6 passes between a conveying roller 16 and a moving glass 18, and is discharged onto a document discharge tray 31 through a discharge flapper 20 and a pair of discharge rollers 8.

A back side image reading unit 17 is disposed on the conveyance path from the skimming glass 201 to the pair of discharge rollers 8, so the back side image of the document can be read. The back side image reading unit 17 is a reading unit of a contact image sensor (CIS) system, and reads the image of the document passing between the conveying roller 16 and the moving glass 18.

After the above conveyance, the document can be reversed and the back side of the document may also be read by the skimming glass 201. The pair of discharge rollers 8 is reversed with the neighborhood of the rear edge of the document being sandwiched between the pair of discharge rollers 8, and the document is guided to a reversing path 19 by the discharge flapper 20. The document guided to the reversing path 19 is made to abut against the resist roller 4 to become looped, thereby preventing the skew feeding. Then, the document is moved again to the skimming glass 201 by the conveying roller 5 and the large roller 7, and the back side is read similarly to the front side.

The reader 200 optically reads and photoelectrically converts the document image and inputs the document image as image data. The reader 200 includes the skimming glass 201, a platen glass 202, a scanner unit 209, mirrors 205 and 206, a lens 207, and a charge coupled device (CCD) 208. The scanner unit 209 includes a lamp 203 and a mirror 204. A white plate 210 used in shading correction is disposed adjacently to the skimming glass 201.

(Description of the Operation)

FIGS. 2A to 2D are cross-sectional views of the ADF 100 and the reader 200. Using those figures, the one pass double side sequence in this embodiment will be described.

Figure 2A:
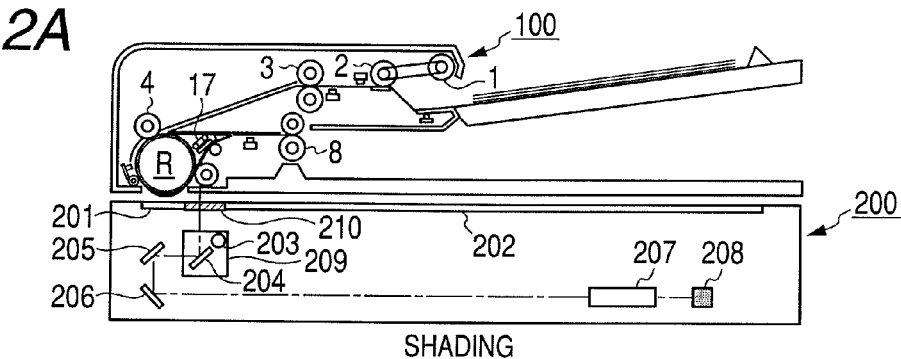
FIGS. 2A, 2B, 2C and 2D are views for illustrating a one pass double side sequence in the image reading apparatus.

When the ADF 100 is instructed to start document feeding by the reader 200, the scanner unit 209 moves to immediately below the white plate 210, and performs shading correction. The back side image reading unit 17 also performs shading correction by using a non-illustrated white reference plate on the moving glass 18 (FIG. 2A).

Figure 2B:
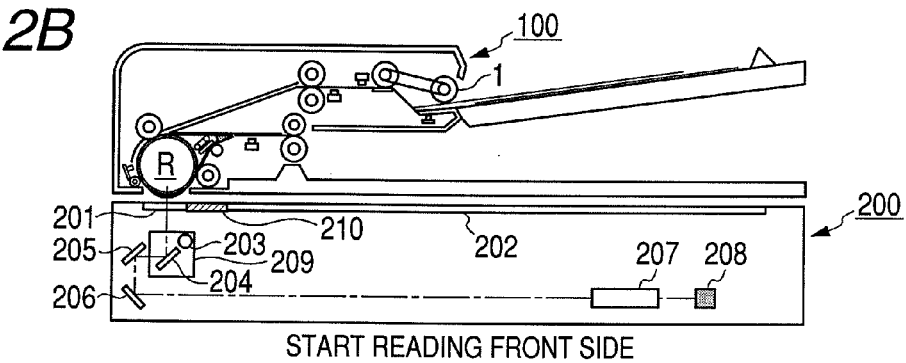

One sheet on the top of the document stack is separated therefrom by the feeding roller 1, the separating roller 2 and the pair of conveying rollers 3, and conveyed to the resist roller 4. During this time, the scanner unit 209 moves to immediately below a reading position R, and when the resist roller 4 rotates, the document is conveyed onto the skimming glass 201 (FIG. 2B).

The document reading operation is started at the timing when the leading edge of the document passes the reading position R. Whether the leading edge of the document has passed the reading position R or not is determined with reference to the timing when a read sensor 12 detects the leading edge of the document. The document is conveyed at a predetermined speed on the reading position R, and irradiated with light by the lamp 203. The light reflected at the document is reflected at the mirrors 204, 205 and 206, and passes through the lens 207 to reach the CCD 208. By the CCD 208 converting light into an electric signal, the image data of the document is obtained.

Figure 2C:
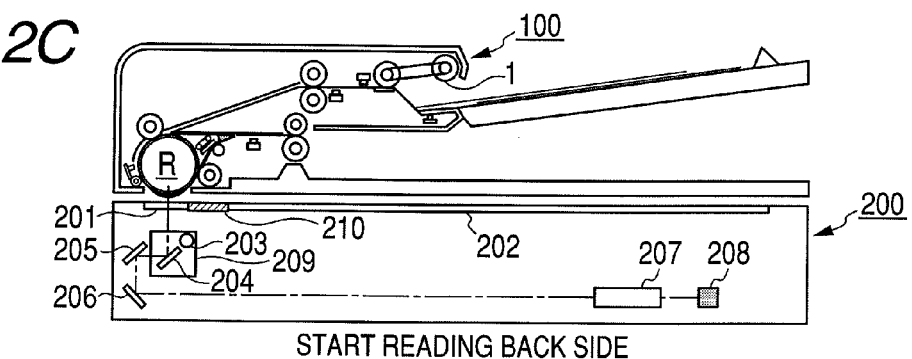

In the case of a simultaneous double side reading mode, the image of the back side of the document is read by the back side image reading unit 17 while the image of the front side of the document is being read (FIG. 2C). When the back side image reading unit 17 finishes reading the back side image to the rear edge, the document is discharged onto the document discharge tray 31 by the pair of discharge rollers 8 (FIG. 2D).

When the rear edge of the N-th document being read at the reading position R passes between the pair of conveying rollers 3, the feeding of the (N+1)-th document is started from the document stack placed on the document tray 30. This document is similarly conveyed to the skimming glass 201, and an image reading operation is performed. At this time, by controlling the activation timing of the resist roller 4 with the document abutting against the resist roller 4, the distance from the previous document being read at the reading position R is adjusted as appropriate.

Figure 2D:
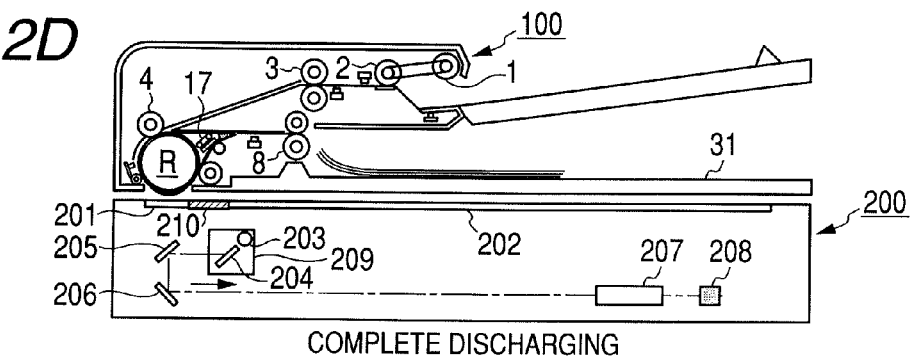

When the document reading and discharging is all completed, the scanner unit 209 is moved in the direction of the arrow as illustrated in FIG. 2D.

(Control Block)

Figure 3:
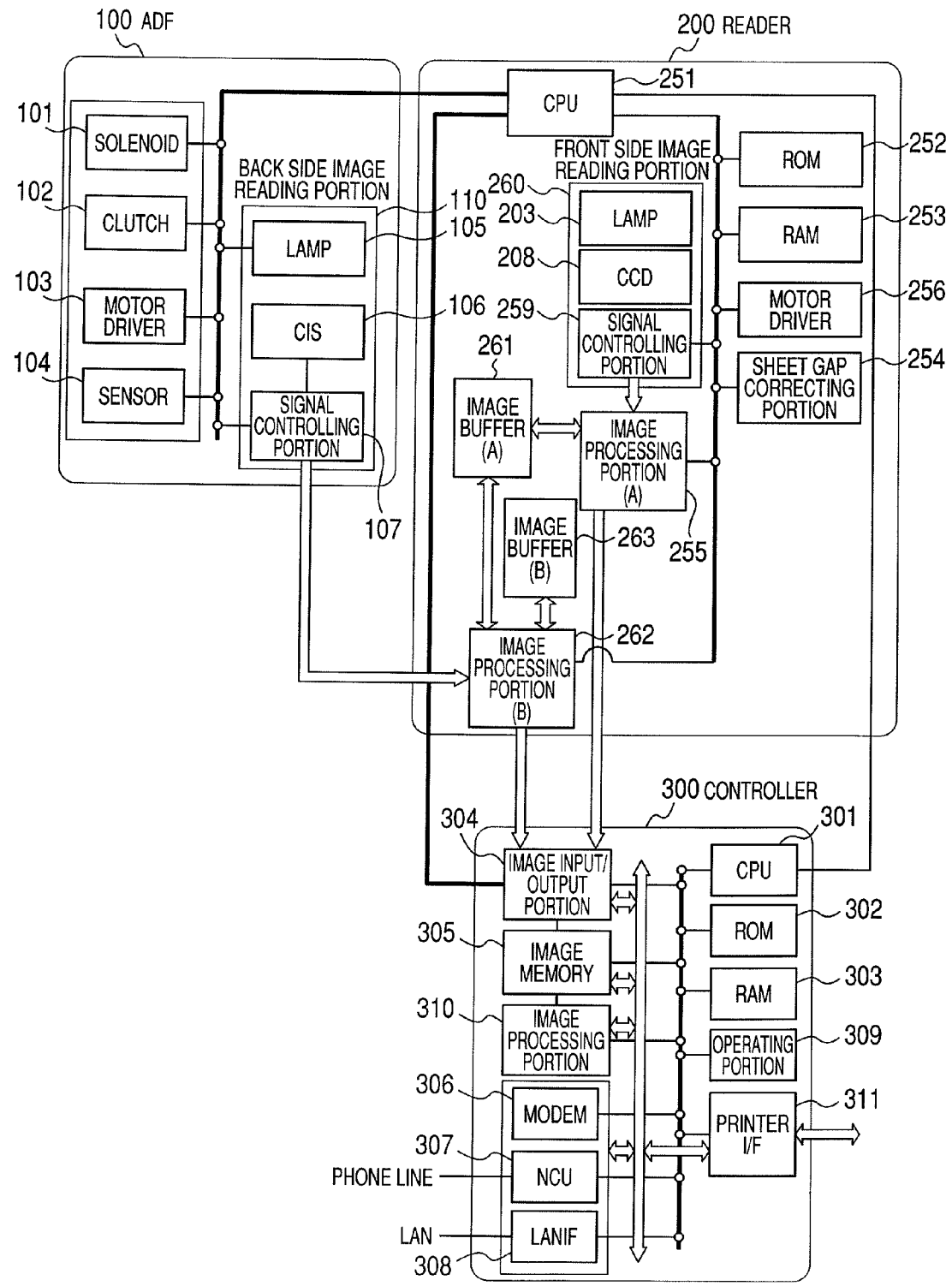
FIG. 3 is a control block diagram of the ADF 100, the reader 200, and a controller 300 in the image reading apparatus.

FIG. 3 is a control block diagram of the ADF 100, the reader 200 and a controller 300. The ADF 100, the reader 200 and the controller 300 are connected so as to communicate with each other.

A CPU 251 is provided in the reader 200, and controls the ADF 100 and the reader 200. A ROM 252 storing programs and a random access memory (hereinafter, referred to as RAM) 253 for work area are connected to the CPU 251. The ROM 252 stores the control program of the reader 200 and the ADF 100. The RAM 253 stores the input data and the work data used in the above control. A motor driver 256 is a driver circuit for driving an optical system driving motor.

A front side image reading portion 260 is provided with the lamp 203, the CCD 208 and a signal controlling portion 259 converting the output from the CCD 208 into a digital image signal, and reads the image of the front side (first side) of the document. The CPU 251 performs the control of the image reading in the reader 200 by using the motor driver 256 and the front side image reading portion 260. A sheet gap correcting portion 254 performs parameter correction of the signal controlling portion 259 in the gap between documents.

An image processing portion (A) 255 processes the front side image signal read by the front side image reading portion 260, and transfers the front side image signal to the controller 300. An image buffer (A) 261 temporarily stores the front side image signal processed by the image processing portion (A) 255.

A back side image reading portion 110 is provided with a lamp 105, a CIS 106 and a signal controlling portion 107 converting the output from the CIS 106 into a digital image signal, and reads the image of the back side (second side) of the document. The CPU 251 performs the control of the image reading in the reader 200 by using the back side image reading portion 110.

An image processing portion (B) 262 processes the back side image signal read by the back side image reading portion 110, and transfers the back side image signal to the controller 300. An image buffer (B) 263 temporarily stores the back side image signal processed by the image processing portion (B) 262.

The ADF 100 is provided with a motor driver 103 for driving a conveyance system driving motor and with various sensors 104 including sensors 10 to 13. The CPU 251 is connected to a solenoid 101, a clutch 102, the motor driver 103 and the various sensors 104.

The CPU 251 controls the document conveyance according to the control program stored in the ROM 252. The image processing portion (A) 255 reads the front side image data stored in the image buffer (A) 261, and transfers the front side image data to the controller 300 in succession. The image processing portion (B) 262 reads the back side image data stored in the image buffer (B) 263, and transfers the back side image data to the controller 300 in succession.

The controller 300 includes a CPU 301, a ROM 302 and a RAM 303. The controller 300 functions as an image processor that performs predetermined image processing on the image data transferred from the reader 200. The image signal transferred to the controller 300 by way of the image processing portion (A) 255 is received by an image input/output portion 304, and accumulated in an image memory 305 in order of transfer. An image processing portion 310 performs various image processings on the image inputted from the image input/output portion 304 or the image accumulated in the image memory 305.

An operating portion 309 accepts an instruction input from a user. The CPU 301 performs various controls in response to the instruction input. For example, the CPU 301 outputs the image signal accumulated in the image memory 305 to a non-illustrated printer through a printer interface 311. The CPU 301 modulates the image signal accumulated in the image memory 305 by a modem 306, and transmits the image signal to an external line from a network control unit (NCU) 307. Further, the CPU 301 transfers the image signal accumulated in the image memory 305 to another apparatus or a computer through a local area network (LAN) interface 308.

Moreover, the CPU 301 indicates, to the reader 200, the operation necessary for executing the function that the user specifies with the operating portion 309, and receives a response from the CPU 251.

While in this embodiment, a CIS is used as the back side image reading portion 110 of the ADF 100 and a CCD is used as the front side image reading portion 260 of the reader 200, the present invention is not limited to this structure. For example, a CIS may be used as each of the back side image reading portion 110 and the front side image reading portion 260, or a CCD may be used as each thereof. Moreover, any sensor may be used as long as the sensor is an image reading sensor.

(Overall Control of Simultaneous Double Side Reading)

Figure 4:
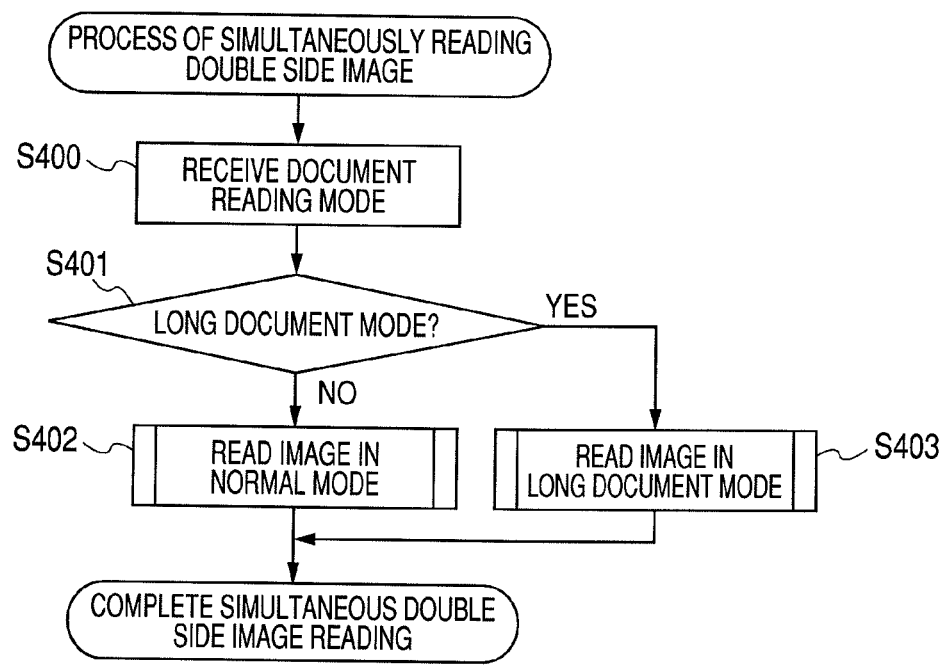
FIG. 4 is a flowchart of a simultaneous double side reading in the image reading apparatus.

FIG. 4 is a flowchart of control of the simultaneous double side reading. Using this figure, the overall control of the one pass double side sequence in this embodiment will be described. This flowchart is executed by the CPU 251 of the reader 200.

First, the user sets the document reading mode by using the operating portion 309. The document reading mode includes a long document mode and a normal mode. The long document mode is for reading documents whose lengths in the conveyance direction are longer than a predetermined length. The normal mode is for reading documents whose lengths in the conveyance direction are equal to or less than the predetermined length. In this embodiment, the long document mode is for reading documents longer than the A3 size, and the normal mode is for reading documents equal to or less than the A3 size.

The CPU 251 receives the document reading mode set by the operating portion 309 from the controller 300 (S400). Then, the CPU 251 determines whether the long document mode is set as the received document reading mode or not (S401).

When it is determined that the normal mode is set, the CPU 251 performs image reading in the normal mode (S402). On the other hand, when it is determined that the long document mode is set, the CPU 251 performs image reading in the long document mode (S403).

The step S401 as to the determination about the long document mode is not limited to this embodiment. For example, the apparatus may actually detect the document length in the conveyance direction thereby inputting the mode by the user is omitted. Specifically, a structure may be adopted such that the CPU 251 detects the document length in the conveyance direction in accordance with the time from when a pre-resist sensor 11 detects the leading edge of the document to when the pre-resist sensor 11 detects the rear edge thereof, and determines whether the document is a long document or not.

(Simultaneous Double Side Reading in Normal Mode)

Figure 5:
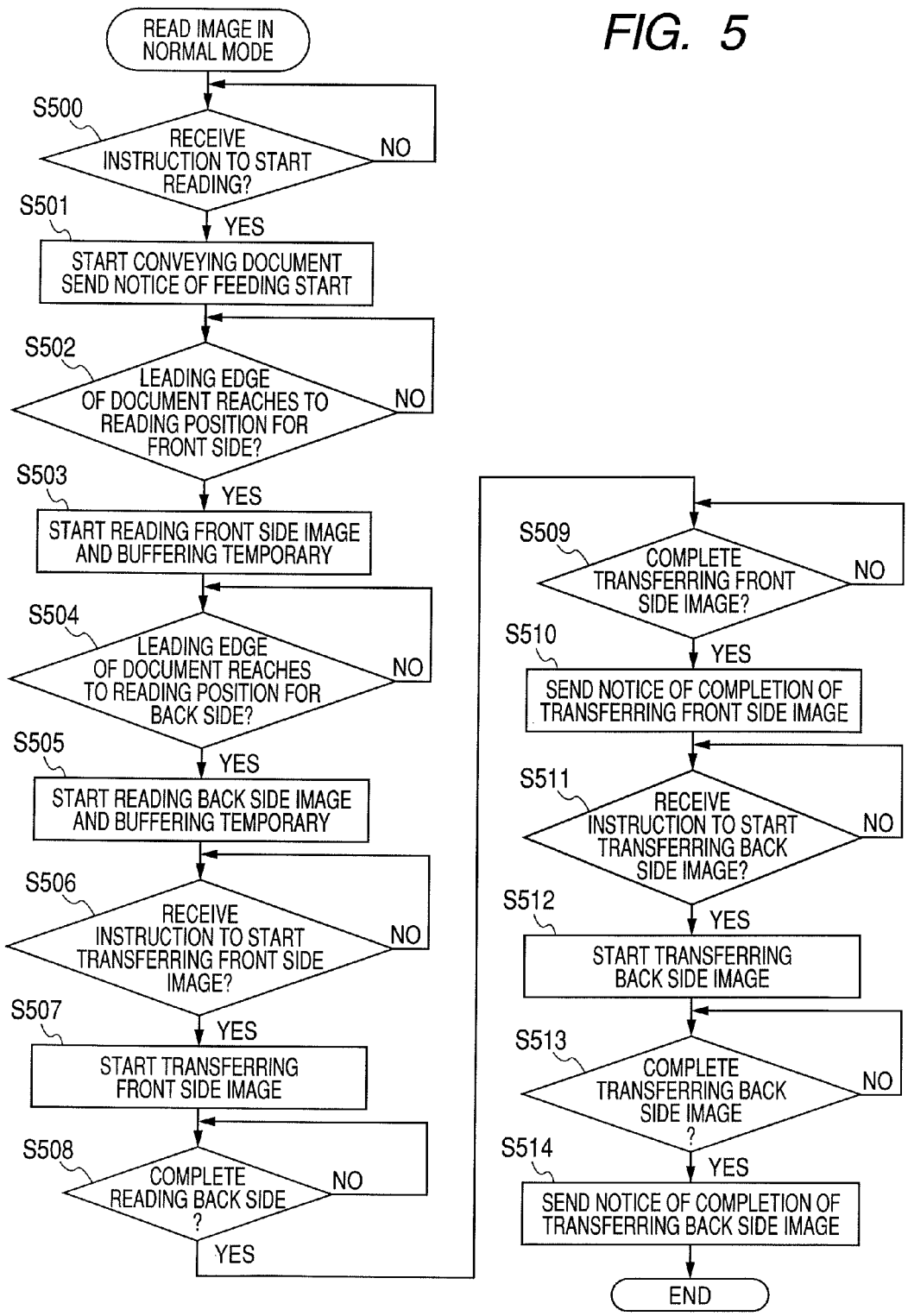
FIG. 5 is a flowchart of a simultaneous double side reading control in a normal mode.

FIG. 5 is a flowchart of the simultaneous double side reading control in the normal mode. This flowchart is executed by the CPU 251 of the reader 200. For simplification, FIG. 5 illustrates an example of the operation of conveying one document, reading the image thereof and transferring the image signal from the reader 200 to the controller 300. When the number of documents is more than one, the CPU 251 basically repeats the control the number of times corresponding to the number of documents.

First, when the user presses a start key on the operating portion 309, the controller 300 transmits an "instruction to start reading" to the reader 200. The CPU 251 of the reader 200 determines whether the "instruction to start reading" has been received or not (S500). When the CPU 251 determines that the "instruction to start reading" has been received, the CPU 251 causes the ADF 100 to start the document conveying operation for reading, and transmits a "notice of feeding start" to the controller 300 (S501).

Then, the CPU 251 waits until one sheet of document is conveyed and the leading edge of the document reaches the reading position R (S502). When the CPU 251 determines that the leading edge of the document has reached the reading position R, the CPU 251 causes the front side image reading portion 260 to read the image of the front side of the document while continuing the document conveyance. The CPU 251 causes the image processing portion (A) 255 to store the image read by the front side image reading portion 260 in the image buffer (A) 261 (S503).

Then, the CPU 251 waits until the leading edge of the document reaches the reading position of the back side image reading unit 17 (S504). When the CPU 251 determines that the leading edge of the document has reached the reading position of the back side image reading unit 17, the CPU 251 causes the back side image reading portion 110 to read the image of the back side of the document. The CPU 251 causes the image processing portion (B) 262 to store the image read by the back side image reading portion 110 in the image buffer (B) 263 (S505). The image reading operations of the front and back sides can be performed in parallel.

On completion of the preparation for the reception of the front side image, the controller 300 transmits an "instruction to start transferring the front side image" to the reader 200. The CPU 251 of the reader 200 determines whether the "instruction to start transferring the front side image" has been received from the controller 300 or not (S506). When the CPU 251 determines that the "instruction to start transferring the front side image" has been received, the CPU 251 causes the image processing portion (A) 255 to transfer the front side image temporarily stored in the image buffer (A) 261 to the controller 300 (S507). At this time, it is unnecessary that the reading of the front side image be completed, and the CPU 251 may start transferring the front side image while the document is being read.

Then, the CPU 251 determines whether the reading of the back side image performed in parallel with the transfer of the front side image has been completed or not (S508). When the CPU 251 determines that the reading of the back side image has been completed, the CPU 251 determines whether the transfer of the front side image has been completed or not (S509). When the CPU 251 determines that the transfer of the front side image has been completed, the CPU 251 transmits a "notice of completion of transferring the front side image" to the controller 300 (S510).

On completion of the preparation for the reception of the back side image, the controller 300 transmits an "instruction to start transferring the back side image" to the reader 200. The CPU 251 of the reader 200 determines whether the "instruction to start transferring the back side image" has been received from the controller 300 or not (S511). When the CPU 251 determines that the "instruction to start transferring the back side image" has been received, the CPU 251 causes the image processing portion (B) 262 to transfer the back side image temporarily stored in the image buffer (B) 263 to the controller 300 (S512).

Then, the CPU 251 determines whether the transfer of the back side image has been completed or not (S513). When the CPU 251 determines that the transfer of the back side image has been completed, the CPU 251 transmits a "notice of completion of transferring the back side image" to the controller 300 (S514), and ends the reading operation.

Figure 6:
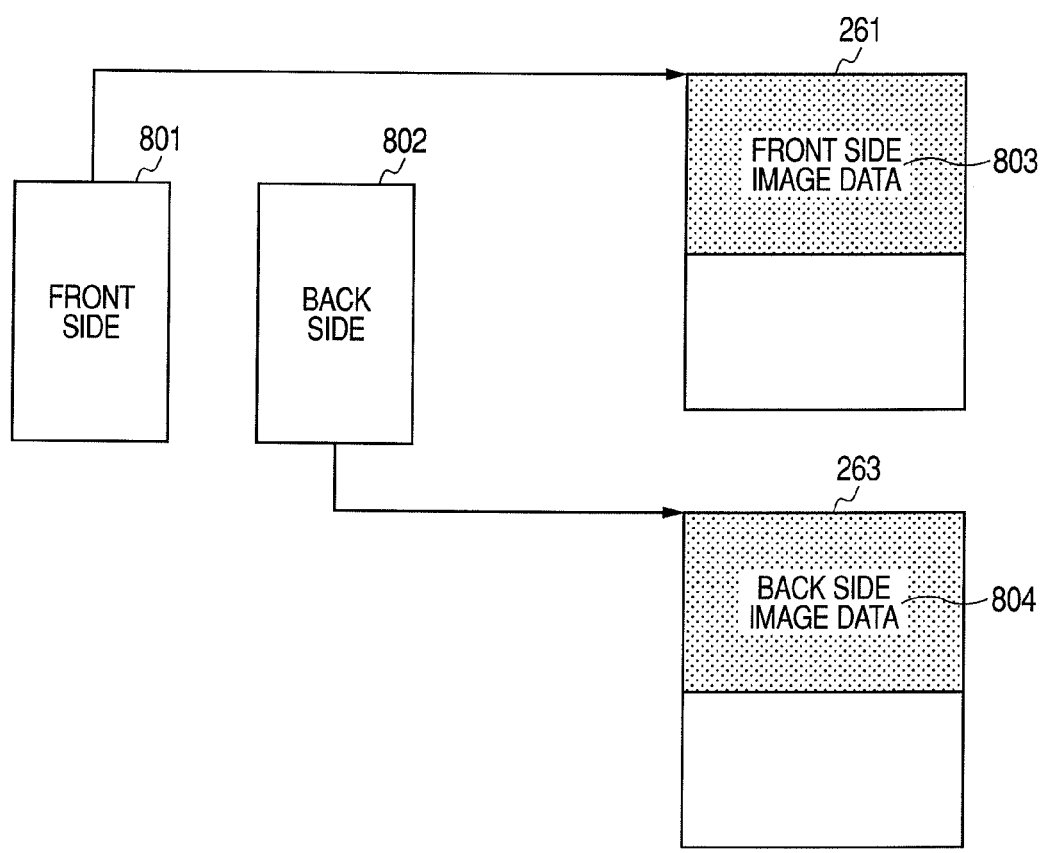
FIG. 6 is a schematic view illustrating buffer processing of front side image data and back side image data of a document of a normal size.

FIG. 6 is a schematic view illustrating the buffer processing of the front side image data and the back side image data of a document of a normal size. A front side 801 of the document is read by the front side image reading portion 260, and stored in the image buffer (A) 261 as front side image data 803. A back side 802 of the document is read by the back side image reading portion 110, and stored in the image buffer (B) 263 as back side image data 804.

The memory size of the image buffer (A) 261 and the memory size of the image buffer (B) 263 is a size capable of storing the image data of an A3-size document that is read with a maximum resolution (for example, 600 dpi). For example, when an A4-size document is read with a maximum resolution, the image data occupies approximately half the area of the image buffer (A) 261 and the image buffer (B) 263 as illustrated in FIG. 6.

Figure 7:
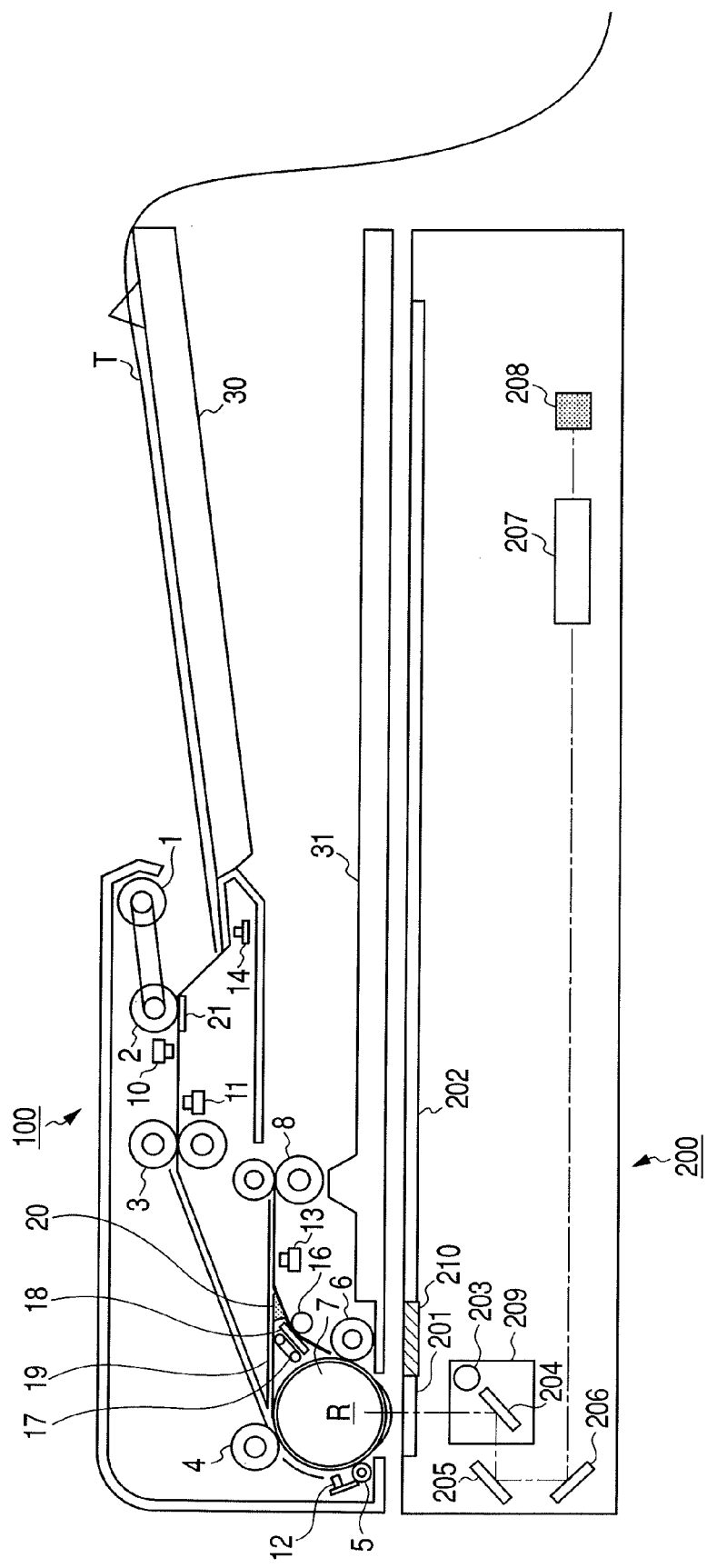
FIG. 7 is a cross-sectional view of the image reading apparatus when a long document is placed on a document table.

However, when the document is a long document of equal to or larger than the A3 size as illustrated in FIG. 7, there are cases where the image data cannot all be stored in the image buffers. To cope with this problem, the control for the case of a long document will be described.

(Simultaneous Double Side Reading in Longitudinal Mode)

Figure 8:
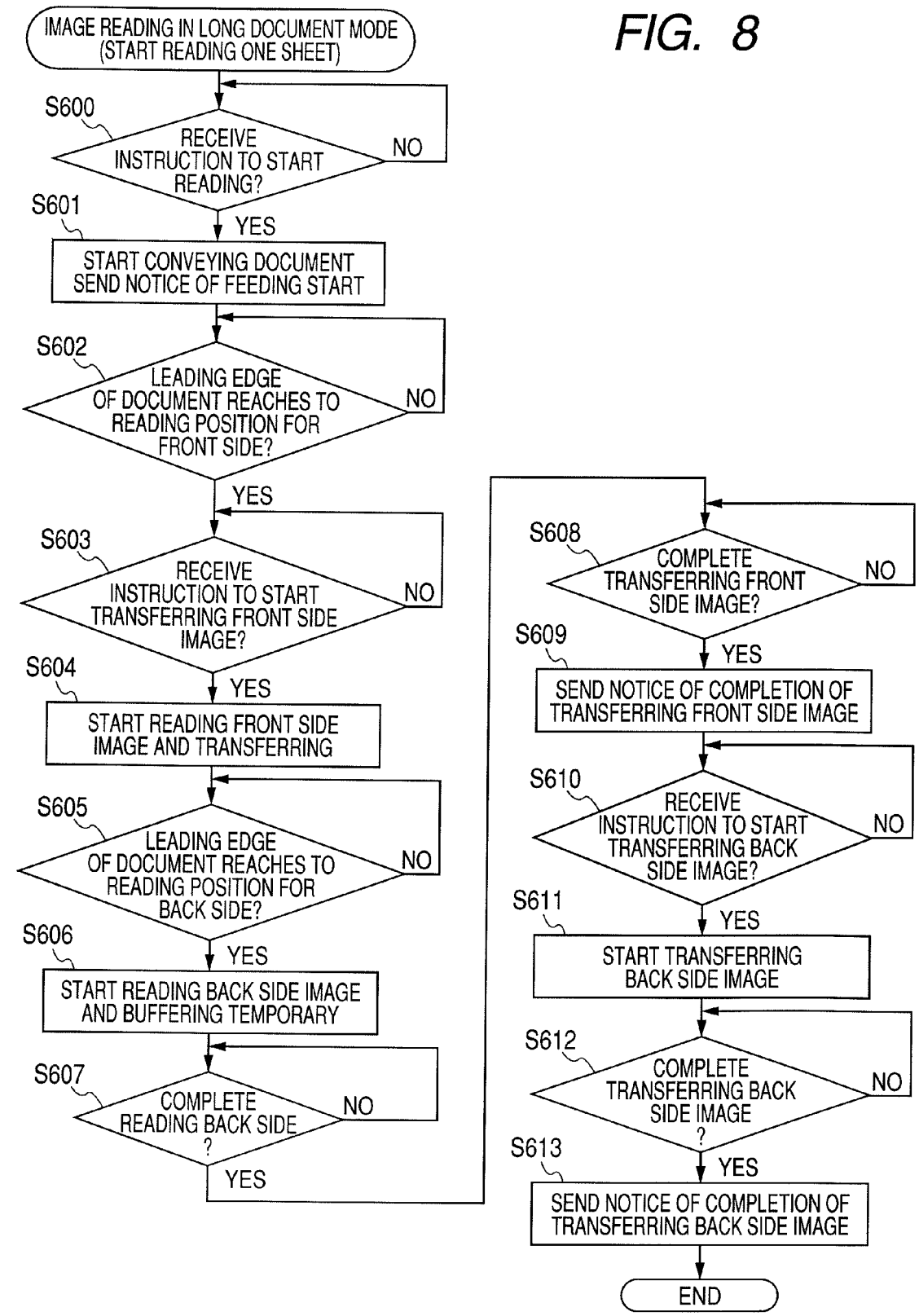
FIG. 8 is a flowchart of the simultaneous double side reading control in a long document mode.

FIG. 8 is a flowchart of the simultaneous double side reading control in the long document mode. This flowchart is executed by the CPU 251 of the reader 200. For simplification, FIG. 8 illustrates an example of the operation of conveying one long sheet of document, reading the image thereof and transferring the image signal from the reader 200 to the controller 300. When the number of documents is more than one, the CPU 251 basically repeats the control the number of times corresponding to the number of documents.

First, when the user presses a start key on the operating portion 309, the controller 300 transmits an "instruction to start reading" to the reader 200. The CPU 251 of the reader 200 determines whether the "instruction to start reading" has been received or not (S600). When the CPU 251 determines that the "instruction to start reading" has been received, the CPU 251 causes the ADF 100 to start the document conveying operation for reading, and transmits a "notice of feeding start" to the controller 300 (S601).

Then, the CPU 251 waits until one document is conveyed and the leading edge of the document reaches the reading position R (S602). When the CPU 251 determines that the leading edge of the document has reached the reading position R, the CPU 251 determines whether the "instruction to start transferring the front side image" has been received from the controller 300 or not (S603). When the CPU 251 determines that the "instruction to start transferring the front side image" has not been received, the CPU 251 stops the conveyance of the document, and waits until the "instruction to start transferring the front side image" is received.

When the CPU 251 determines that the "instruction to start transferring the front side image" has been received, the CPU 251 conveys the document so as to pass the reading position R and causes the front side image reading portion 260 to read the image of the front side of the document. The CPU 251 causes the image processing portion (A) 255 to transfer the image read by the front side image reading portion 260 to the controller 300 without storing the image in the image buffer (A) 261 (S604).

Then, the CPU 251 waits until the leading edge of the document reaches the reading position of the back side image reading unit 17 (S605). When the CPU 251 determines that the leading edge of the document has reached the reading position of the back side image reading unit 17, the CPU 251 causes the back side image reading portion 110 to read the image of the back side of the document. The CPU 251 causes the image processing portion (B) 262 to store the image read by the back side image reading portion 110 in the image buffer (A) 261 and the image buffer (B) 263 (S606).

Figure 9:
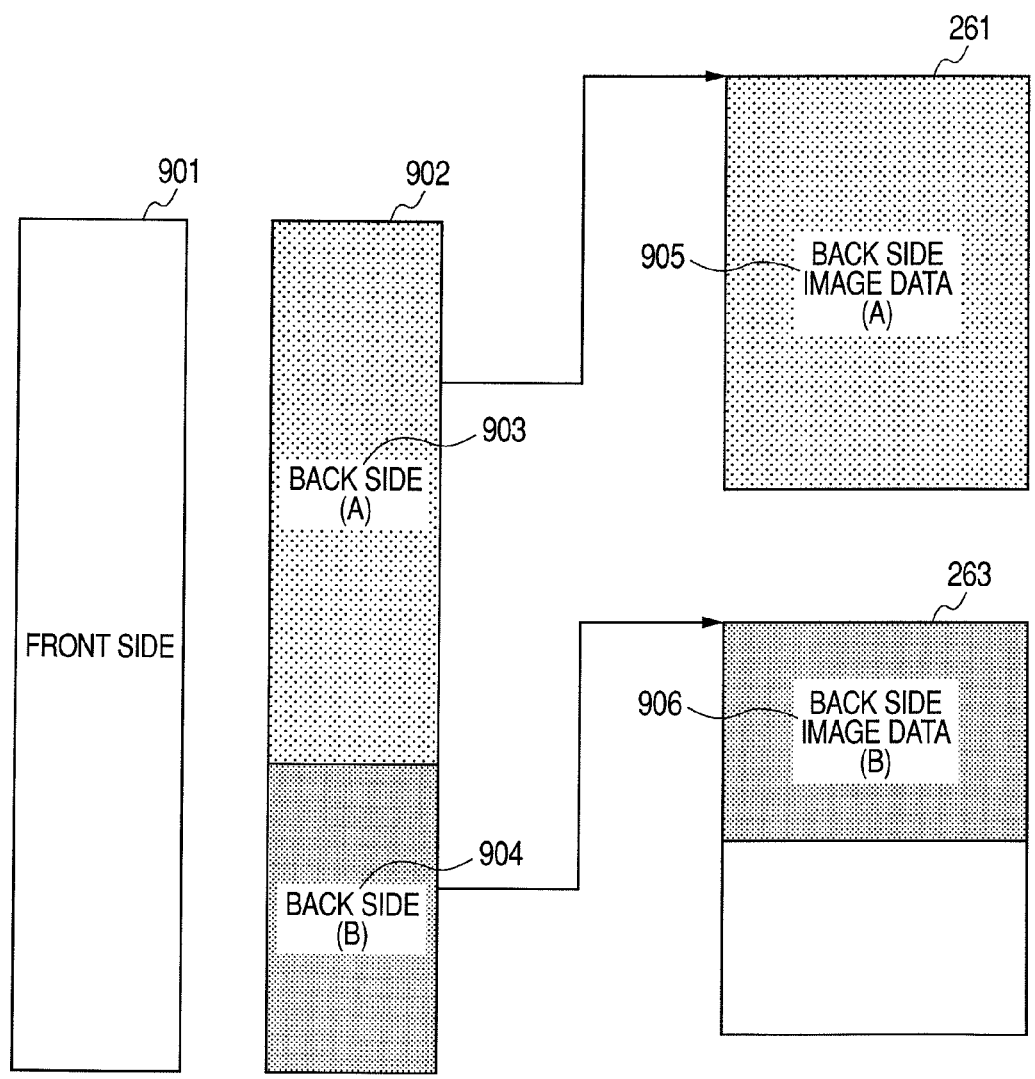
FIG. 9 is a schematic view illustrating the buffer processing of the back side image data of a long document.

The processing at step S606 will concretely be described by using FIG. 9. FIG. 9 is a schematic view illustrating the buffer processing of the back side image data of a long document. As described with respect to step S604, a front side 901 of the document is read by the front side image reading portion 260, and the image data of the front side is transferred to the controller 300 without being buffered.

On the other hand, a back side 902 of the document is read by the back side image reading portion 110, and the image data of the back side is transferred to the image buffer (A) 261. The image data of the back side is transferred until the size of the image data transferred to the image buffer (A) 261 corresponds to the memory size of the image buffer (A) 261. In the example of FIG. 9, the image data corresponding to the part of a back side (A) 903 of the back side 902 is stored in the image buffer (A) 261 as back side image data (A) 905.

Then, the destination of transfer of the image data is switched to the image buffer (B) 263, and the image data corresponding to the part of a back side (B) 904 is stored in the image buffer (B) 263 as back side image data (B) 906. That is, the image data of the back side is divisionally stored in both of the image buffer (A) 261 and the image buffer (B) 263.

To return to the description of FIG. 8, the CPU 251 determines whether the reading of the back side image has been completed or not (S607). When the CPU 251 determines that the reading of the back side image has been completed, the CPU 251 determines whether the transfer of the front side image has been completed or not (S608). When determining that the transfer of the front side image has been completed, the CPU 251 transmits a "notice of completion of transferring the front side image" to the controller 300 (S609).

On completion of the preparation for the reception of the back side image, the controller 300 transmits an "instruction to start transferring the back side image" to the reader 200. The CPU 251 of the reader 200 determines whether the "instruction to start transferring the back side image" has been received from the controller 300 or not (S610). When the CPU 251 determines that the "instruction to start transferring the back side image" has been received, the CPU 251 transfers the back side image temporarily stored in the image buffer (A) 261 and the image buffer (B) 263 to the controller 300 (S611).

Then, the CPU 251 determines whether the transfer of the back side image has been completed or not (S612). When the CPU 251 determines that the transfer of the back side image has been completed, the CPU 251 transmits a "notice of completion of transferring the back side image" to the controller 300 (S613), and ends the reading operation.

According to this embodiment, in the case of the long document mode, the start of the reading operation is slightly delayed because it is necessary to wait to start the reading operation until the instruction to start transferring the image of the front side is issued from the controller 300. However, it is unnecessary to provide an image buffer of a large size enough to store the image data of a long document, so cost reduction can be realized.

According to this embodiment, there can be provided an image reading apparatus that is capable of reading both sides of a long document without increasing the memory size in the structure in which the images of both sides of a document are read by one document conveyance.

The front side image reading portion 260 corresponds to the first reader. The back side image reading portion 110 corresponds to the second reader. The image buffer (A) 261 and the image buffer (B) 263 correspond to the first storage and the second storage respectively. The controller 300 corresponds to the image processing apparatus. The image processing portion (A) 255 and the image processing portion (B) 262 correspond to the transmitter. The CPU 251 corresponds to the controller.

In the embodiments described above, the memory capacity is insufficient if the document to be read is a long document. However, there may be other situations in which the memory capacity may be insufficient. For example, even if the same size of document is always read, a user may want to have a higher image reading resolution. The present invention is applicable in such situations too.

Also, in the preferred embodiment, all of the first-side data of a long document is "non-stored data" that is transmitted without being stored. However, the non-stored data could be made up of some of the first-side data and some of the second-side data. All that matters is that there is enough memory capacity to store the remaining data read from the document. For example, the non-stored data could be made up of the part of the first-side data representing the top half of the first side of a long document and the part of the second-side data representing the top half of the second side of the long document. In this case, the bottom half of the first side could be stored in the first storage and the bottom half of the second side could be stored in the second storage. In general, in the second operating mode (e.g. "long document mode") it is sufficient that some or all of at least one of the first-side data and the second-side data is non-stored data.

Depending on the design of the storage and transmitter and other matters, what is transmitted to the external apparatus (e.g. image processing apparatus) may not be identical to what is stored in the storage. For example, the transmitter might invert the data received from the storage/reader or carry out some processing such as encryption or coding of the stored/read data. Accordingly, what is transmitted to the external apparatus may be data derived from the first-side data, second-side data or non-stored data, as the case may be.

One preferred embodiment of the present invention can provide an image reading apparatus comprising: a first reader operable to read an image of said first side of a document; a first storage operable to store the image read by the first reader; a second reader operable to read an image of said second side of the document; a second storage operable to store the image read by the second reader; wherein said control means are operable, when reading a first document whose length in a conveyance direction is longer than a predetermined length, to cause the transmitter means to transmit the image read by the first reader to the external apparatus, and to cause the first storage and the second storage to store the image read by the second reader.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-120799, filed May 1, 2007, which is hereby incorporated by reference herein in its entirety.

What is claimed is:

1. A document reading apparatus communicable with an image processing apparatus, comprising:
    a conveying unit which conveys a document;
    a first reading unit which reads an image on a first side of the document conveyed by the conveying unit;
    a second reading unit which reads an image on a second side of the document conveyed by the conveying unit;
    a storage unit which stores image data output from the first and second reading units;
    a transmitter unit which transmits the image data stored in the storage unit to the image processing apparatus; and
    a control unit which selects a mode in accordance with a length of the document in a conveyance direction,
    the control unit which, in case that the length of the document is equal to or less than a predetermined length, selects a first mode,
    the control unit which, in case that the length of the document is longer than the predetermined length, selects a second mode,
    wherein, in the first mode, the control unit causes the conveying unit to convey the document to a reading position of the first reading unit without waiting for an instruction to start transferring from the image processing apparatus, the control unit causes the first reading unit to read the image on the first side of the document conveyed by the conveying unit, causes the storage unit to store the image data of the first side read by the first reading unit, and causes the storage unit to store the image data of the second side read by the second reading unit, and the control unit causes the transmitter unit to transmit the image data of the first and second sides stored in the storage unit to the image processing apparatus according to the instruction to start transferring from the image processing apparatus, and
    in the second mode, the control unit causes the conveying unit to convey the document to the reading position of the first reading unit according to the instruction to start transferring from the image processing apparatus, and causes the first reading unit to read the image on the first side of the document conveyed by the conveying unit, the control unit causes the transmitter unit to transmit the image data of the first side read by the first reading unit to the image processing apparatus without storing in the storage unit, the control unit causes the storage unit to store the image data of the second side read by the second reading unit, and causes the transmitter unit to transmit the image data of the second side stored in the storage unit to the image processing apparatus.

2. The document reading apparatus according to claim 1, wherein the storage unit has a first storage unit and a second storage unit, and
    wherein, in the case that the length of the document is equal to or less than the predetermined length in the conveyance direction, the control unit causes the first storage unit to store the image data of the first side read by the first reading unit, and the control unit causes the second storage unit to store the image data of the second side read by the second reading unit, and
    wherein, in the case that the length of the document is longer than the predetermined length in the conveyance direction, the control unit causes the first and second storage units to store the image data of the second side read by the second reading unit.

3. The document reading apparatus according to claim 1, wherein, in the first mode, the control unit controls so as to store the image data of the first side read by the first reading unit in a first storage area of the storage unit, and to store the image data of the second side read by the second reading unit in a second storage area of the storage unit, and wherein, in the second mode, the control unit controls so as to store the image data of the second side read by the second reading unit in the first and second storage areas of the storage unit.

* * * * *